United States Patent [19]

Kasowski et al.

[11] Patent Number: 5,319,013
[45] Date of Patent: Jun. 7, 1994

[54] FIBER AND FILM OF IMPROVED FLAME RESISTANCE CONTAINING MIXED OXIDES OF TUNGSTEN

[75] Inventors: Robert V. Kasowski, West Chester, Pa.; Kiu-Seung Lee, Richmond, Va.

[73] Assignee: E. I. Du Pont de Nemours and Company, Wilmington, Del.

[21] Appl. No.: 974,194

[22] Filed: Nov. 10, 1992

[51] Int. Cl.⁵ .................... C08L 77/10; C08L 79/00
[52] U.S. Cl. ................................ 524/406; 264/344; 427/336; 428/411.1; 428/474.4; 524/606; 524/612

[58] Field of Search ................ 524/406, 606, 612

[56] References Cited

U.S. PATENT DOCUMENTS 3,458,470  7/1969  Edgar et al. ............ 524/406
3,954,703  5/1976  Turnbull ................. 524/406

Primary Examiner—Harold D. Anderson

[57] ABSTRACT

Aramid and polybenzimidazole fibers and films of improved flame resistance are obtained by impregnation with tungsten hexachloride.

6 Claims, 2 Drawing Sheets

FIBER AND FILM OF IMPROVED FLAME RESISTANCE CONTAINING MIXED OXIDES OF TUNGSTEN

BACKGROUND OF THE INVENTION

Aramid fibers such as, for example, poly($m$-phenylene isophthalamide) (MPD-I) fibers and poly($p$-phenylene terephthalamide) (PPD-T) fibers are well-recognized as thermally resistant fibers. Polybenzimidazole (PBI) fiber is another fiber which has been employed in flame resistant applications. These fibers are employed in coats of firefighters, in industrial garments for workers who may be exposed to flame and high temperatures and in many other applications. Thermal stability of the aramid and PBI fibers is attributed to their stiff chain multi-ring structure and to the strong hydrogen bonding between the chains. Further improvement in flame resistance is difficult to attain within the organic fiber framework.

DRAWINGS

FIGS. 1 and 2 are thermogravimetric analysis graphs showing weight loss of a control (FIG. 1) and of a product of the invention (FIG. 2).

SUMMARY OF THE INVENTION

The present invention provides aramid and polybenzimidazole fibers and films of improved flame resistance containing at least 0.1% and preferably from 0.1 to 10% by weight of tungsten in the form of mixed tungsten oxides. The mixed oxides are formed when the tungsten hexachloride ($WCl_6$) is exposed to water. Also comprehended by this invention is a method for preparing the improved fibers and films.

DETAILED DESCRIPTION OF THE INVENTION

Figure 1:
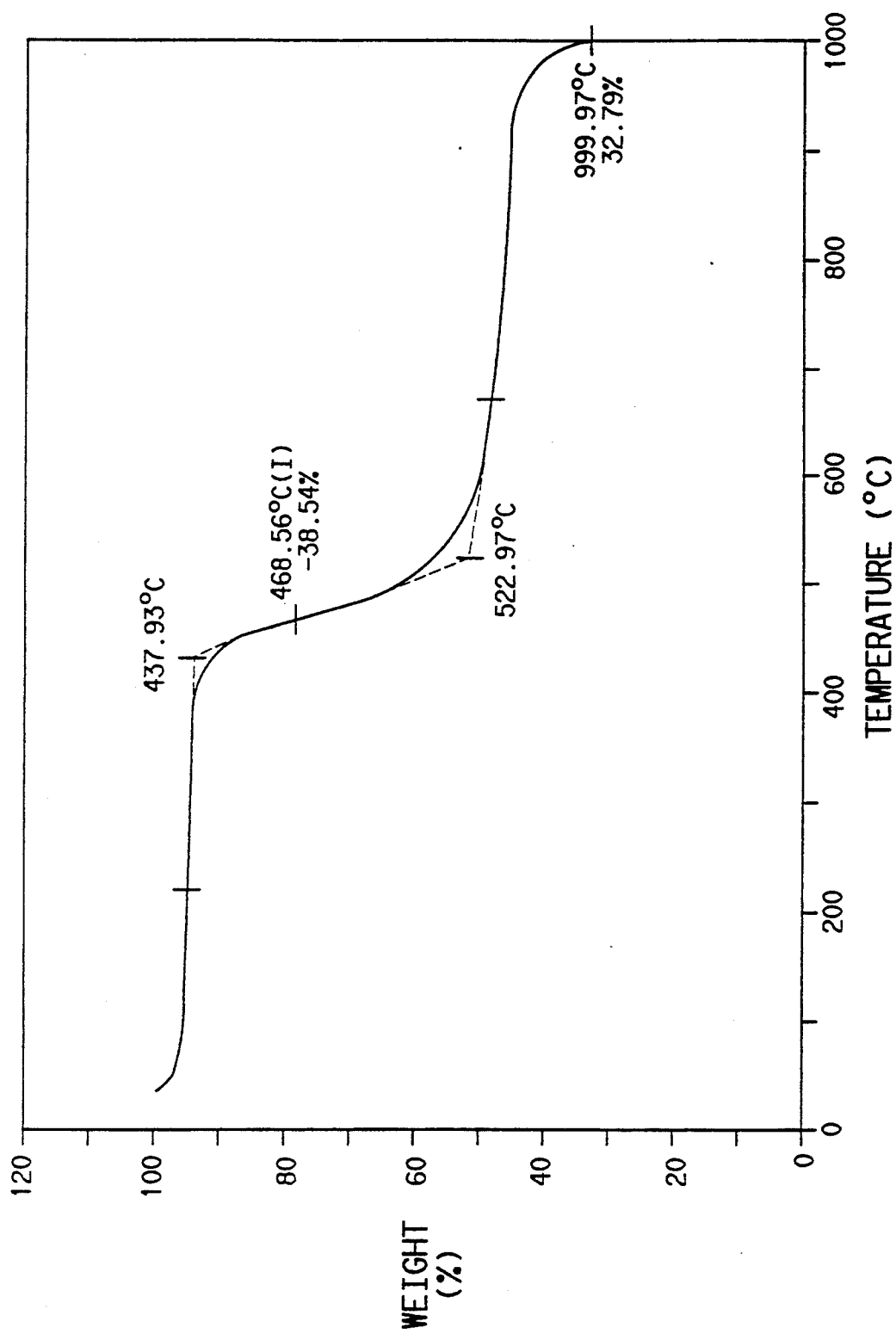

The fibers and films of this invention may be prepared by either of two general procedures. In the more preferred procedure, $WCl_6$ is incorporated in the solution of the polymer (aramid or PBI) to be spun, cast or formed in some other way. This can be done if the solvent of the polymer solution is organic and dissolves the $WCl_6$. If this is not the case, a solution of $WCl_6$ in an organic solvent is imbibed in the preformed fiber or film of the polymer. $WCl_6$ is soluble and stable in N-methyl pyrrolidone (NMP), dimethyl acetamide (DMAc) and in a number of other organic solvents. Those skilled in the art will readily be able to select appropriate solvents.

Examples 1-2 below illustrate one method of preparing aramid fiber of improved flame resistance. In these examples, $WCl_6$ is added directly to the spin dope since the $WCl_6$ is soluble in the solvent of the dope. The spin dope is extruded and the fibers exposed to water. The water converts the $WCl_6$ which is present in the freshly extruded fiber into mixed oxides of tungsten ($WO_x$) where x is the average number of oxygen atoms per tungsten atom.

Example 4 is representative of another method of preparing film of improved flame resistance from an aramid which is not soluble in a suitable solvent for $WCl_6$. In this example, the as-formed film of PPD-T (containing sulfuric acid) is treated with a solution of $WCl_6$ in an organic solvent. The organic solvent extracts sulfuric acid from the film and imbibes $WCl_6$ into the film. Upon treatment of the film with water, the $WCl_6$ converts to the mixed oxides. If desired, the as-formed film of PPD-T may be first washed with aqueous solution to remove the sulfuric acid. The water wet film is then treated with $WCl_6$ solution in an organic solvent to imbibe $WCl_6$ into the film for conversion into the mixed tungsten oxides. In any event, it is believed that the desired mixed tungsten oxides form in film or fiber that is impregnated with $WCl_6$ and contacted with water. The quantity of $WCl_6$ to be employed is that sufficient to provide the amounts of tungsten needed for improved flame resistance.

The presence of even small amounts of tungsten has been found to significantly improve the flame resistance of aramid fiber or films. Fibers and films of PBI can be expected to improve in a similar fashion. The improved polymer fiber or film contains the tungsten in the form of mixed tungsten oxides rather than as the $WCl_6$ which was incorporated. This is because $WCl_6$ upon contact with water converts to mixed tungsten oxides.

The product of the invention is defined by the percentage of tungsten present in the form of mixed oxides. Any amount of tungsten in the fiber or film will be beneficial, but at least 0.1% by wt. is preferred. Amounts exceeding about 10% by wt. do not appear to provide further improvement and are not cost effective. Limiting oxygen index (L.O.I.) is used as a measure of flame resistance.

TEST AND MEASUREMENTS

Tungsten content is measured by inductive coupled plasma-atomic emission spectroscopy as described in ASTM-C 1111-88.

The following examples are illustrative of the invention and are not intended as limiting.

EXAMPLE 1

Preparation of Spin Solution

A filtered spin solution containing 20 parts of MPD-I poly(metaphenylene isophthalamide), 9 parts of calcium chloride ($CaCl_2$) and 71 parts of dimethylacetamide (DMAc) was added to the reaction kettle equipped with stirrer, nitrogen inlet/outlet, thermometer, and an addition port. The polymer has an inherent viscosity of 1.60 as measured on a 0.5% solution in DMAc/4% LiCl at 25° C. The solution was heated to 70° C. under nitrogen with agitation. 1.5 parts of dried tungsten (VI) chloride ($WCl_6$) powder per 100 parts of the spin solution was slowly added to the solution and agitated until all the $WCl_6$ particles are completely dissolved. The solution color changed to light blue. This solution was used for the preparation of the fiber.

Fiber Preparation

The spinning solution is heated to 120-125° C. and extruded at a rate of 0.57 g/min/hole through multi-hole spinnerets, each hole 0.006 inch (150 microns) in diameter and 0.012 inch (300 microns) long, into heated spinning cells. Each cell has 5 heated zones with temperature from top to bottom of 320, 300, 250, 200, and 150° C., and a flow of 395° C. inert gas at about 3.67 pounds/hr (1.67 kg/hr). The fibers are converged at a guide at the bottom of each cell where they are flooded with an aqueous solution containing 7-10% DMAc and 5-7% $CaCl_2$. As soon as the fiber hits the flooded solution, it changes from light blue to black color. Fibers are wound on the bobbin at the speed of 125 yards per minute. The wet bobbin is placed in a plastic bag to keep it from drying. A few hours later, the fiber turned white.

The wet bobbin is fed at 30 ypm to a wash-draw apparatus to be extracted and drawn in aqueous baths contained in a ten-tank apparatus. Total draw ratio is 4.2X, and individual bath concentrations, temperatures and draw ratios are shown in Table 1.

TABLE 1

| | Wash-Draw Machine Settings | | | |
|---|---|---|---|---|
| Tank No. | Draw Ratio (X) | % DMAc | CaCl$_2$ | Temperature, °C. |
| 1 | 1.93 | 29 | 3 | 80 |
| 2 | 1.92 | 29 | 3 | 80 |
| 3 | 1.05 | 29 | 3 | 90 |
| 4 | 1.06 | 5 | 1 | 90 |
| 5 | 1.02 | 1 | — | 90 |
| 6 | 1.01 | — | — | 90 |
| 7 | 1.01 | — | — | 90 |
| 8 | 1.00 | — | — | 90 |
| 9 | 1.00 | — | — | 90 |
| 10 | 1.00 | — | — | 90 |

After the extraction/drawing, the fiber is dried on dryer rolls set at 150° C. Finish is applied and the fiber is wound on a bobbin. The fiber properties, as shown in Table 2, did not change significantly as a result of addition of WCl$_6$ which was prepared similarly except that no WCl$_6$ was added to the spin-solution.

TABLE 2

| | Fiber Physical Properties | | | |
|---|---|---|---|---|
| Fiber Samples | Tungsten Content (%) | Tenacity (gpd) | Elongation (%) | Modulus (gpd) |
| Control | 0.0 | 5.34 | 22.65 | 128 |
| MPD-I/WO$_x$ | 3.24 | 5.08 | 23.24 | 119 |

The fiber is knitted into fabric and tested for Limiting Oxygen Index (LOI) based on ASTM D 2863-77. Results are summarized in Table 3.

TABLE 3

| | LOI of Fabric Samples | |
|---|---|---|
| Fiber Samples | Tungsten Content (%) | Limiting Oxygen Index (LOI) |
| Control | 0.00 | 30 |
| MPD-I/WO$_x$ | 3.24 | 43 |

EXAMPLE 2

This example illustrates the improvements in LOI of MPD-I fibers containing various amounts of tungsten in the form of mixed tungsten oxides. The same procedure described in Example 1 was used except that different amounts of WCl$_6$ were used to prepare the fiber samples which were then knitted into fabric and tested. The results are described in Table 4.

TABLE 4

| LOI of MPD-I Fabric with Different Tungsten Contents | | |
|---|---|---|
| Fiber Samples | Tungsten Content (%) | Limiting Oxygen Index (LOI) |
| Control | 0.00 | 30 |
| MPD-I/WO$_x$ | 0.92 | 37 |
| MPD-I/WO$_x$ | 3.24 | 43 |
| MPD-I/WO$_x$ | 6.94 | 44 |

EXAMPLE 3

Figure 2:
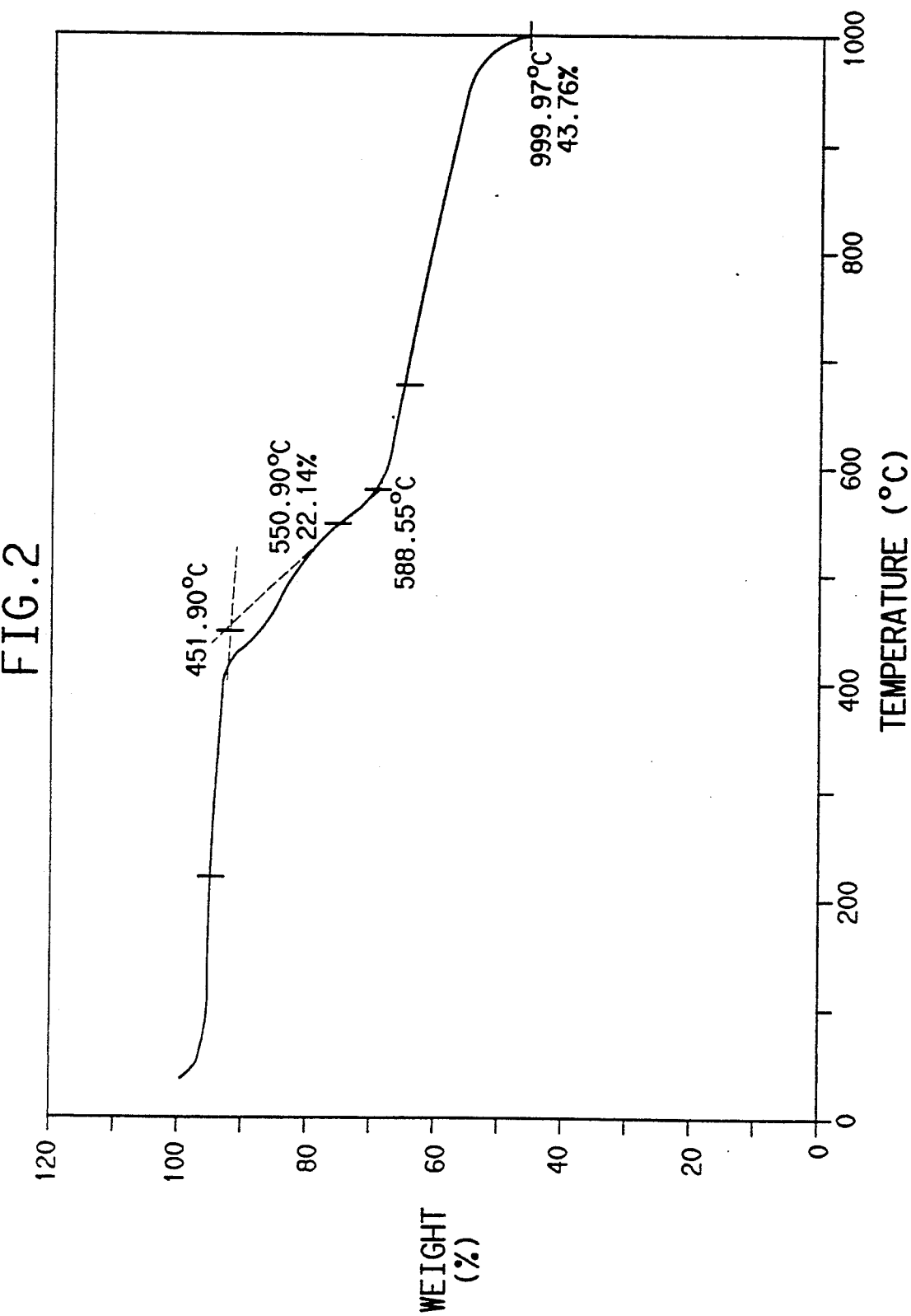

This example illustrates the rate of thermal degradation of tungsten containing MPD-I fibers using thermogravimetric analysis based on ASTM D 3850-84. Results are shown in Table 5 and FIGS. 1 and 2. The Control fiber lost 38.5% of weight between temperatures of 438 and 524° C., while MPD-I fiber with 3.24% tungsten lost only 22.1% of weight at a significantly higher temperature range (452° C. to 589° C.). At 800° C., the control fiber retained only 45% of weight while MPD-I fiber with 3.24% tungsten retained 60% of weight. This shows that the tungsten not only retards the combustion of MPD-I polymer in the presence of oxygen, but also protects the polymer from decomposition under inert environments such as nitrogen.

TABLE 5

| Thermogravimetric Analysis Data of Fibers | | | | |
|---|---|---|---|---|
| Fiber Samples | Tungsten Content (%) | Maximum Temp (°C.) | Degradation % Wt. Loss | Weight Loss at 800° C. |
| Control | 0.00 | 438–523 | 38.5 | 55 |
| MPD-I/WO$_x$ | 3.24 | 452–589 | 22.1 | 40 |

EXAMPLE 4

This example illustrates the preparation of a PPD-T poly(p-phenylene terephthalamide) film containing mixed oxides of tungsten for improvements in flame resistance.

Liquid crystalline PPD-T solution was prepared by dissolving 20 parts (by weight) of PPD-T polymer (inherent viscosity of 6) in 80 parts (weight) of 100% sulfuric acid under nitrogen at about 80° C. This solution was poured on a hot (90° C.) glass plate and smeared into thin film by using 5 mil doctor blade. The film is allowed to cool in a dry box to form a solid film. The film was introduced into a DMAc solution containing 20% (w/w) tungsten hexachloride and heated for 1 hour at 100° C. The film was removed from the solution and placed in room temperature water overnight to remove excess sulfuric acid. The film turned blue and changed back to yellow after about 2 hours when placed in the water. The water was renewed until the pH of the water was close to 7. The film was then placed in a vacuum oven to dry. The same procedure, except for the addition of tungsten hexachloride was used to prepare the control film sample. LOI results of the films are listed in Table 6.

TABLE 6

| LOI of PPD-T Films | |
|---|---|
| Samples | LOI |
| PPD-T control film | 28.5 |
| PPD-T with WO$_x$ | 35.0 |

We claim:

1. Fiber or film of improved thermal stability comprising an aramid, containing at least 0.1% by weight of tungsten in the form of mixed oxides of tungsten based on the weight of the polymer.

2. Fiber or film according to claim 1 containing from 0.1 to 10% of tungsten.

3. Fiber or film according to claim 1 wherein the aramid polymer is poly(m-phenylene isophthalamide)

4. Fiber or film according to claim 1 where the mixed oxides of tungsten are formed by exposure of tungsten hexachloride to water.

5. A fabric prepared from the fiber of claim 1.

6. Fiber of film of improved thermal stability comprising polybenzimidazole containing at least 0.1% by weight of tungsten, in the form of mixed oxides of tungsten, based on the weight of the polymer.

* * * * *